United States Patent [19]

Pelzer

[11] Patent Number: 5,422,063
[45] Date of Patent: Jun. 6, 1995

[54] PROCESS AND A DEVICE FOR COOLING A PIPE DURING ITS MANUFACTURE BY EXTRUSION

[75] Inventor: Rudolf Pelzer, Herzogenrath, Germany

[73] Assignee: Kabelwerk Eupen AG, Herzogenrath, Germany

[21] Appl. No.: 200,450

[22] Filed: Feb. 23, 1994

[30] Foreign Application Priority Data

Feb. 24, 1993 [BE] Belgium ............... 09300171

[51] Int. Cl.⁶ ............................................. B29C 47/88
[52] U.S. Cl. .............................. 264/209.1; 264/209.7; 264/211.18; 264/237; 264/348; 425/71; 425/379.1
[58] Field of Search ............ 264/237, 209.2, 348, 264/28, 209.7, 40.6, 558, 519, 211.13, 211.18, 209.1; 425/71, 381, 378.1, 379.1, 532

[56] References Cited

U.S. PATENT DOCUMENTS

| | | | |
|---|---|---|---|
| 2,425,270 | 8/1947 | Skipper | 264/209.2 |
| 3,129,461 | 4/1964 | Zavasnik et al. | 264/209.1 |
| 3,522,337 | 7/1970 | Ball | 264/558 |
| 3,905,732 | 9/1975 | Rouvin et al. | 425/381 |
| 4,069,282 | 1/1978 | Gutermuth et al. | 264/558 |
| 4,329,314 | 5/1982 | Jackson et al. | 264/519 |
| 4,389,366 | 6/1983 | Hoesslin | 264/558 |
| 4,555,909 | 12/1985 | Gourdine | 264/28 |
| 4,573,893 | 3/1986 | Waters et al. | 425/71 |
| 4,663,107 | 5/1987 | Takada et al. | 264/560 |
| 4,708,841 | 11/1987 | Larsen | 264/558 |
| 4,744,930 | 5/1988 | Twist et al. | 264/40.6 |
| 4,750,873 | 6/1988 | Loe et al. | 264/558 |

FOREIGN PATENT DOCUMENTS

| | | | |
|---|---|---|---|
| 0197647 | 2/1986 | European Pat. Off. | |
| 0209933 | 6/1986 | European Pat. Off. | |
| 2442714 | 8/1980 | France | 425/380 |
| 2023942 | 11/1971 | Germany | 425/379.1 |
| 2257899 | 11/1972 | Germany | |
| 2455779 | 11/1974 | Germany | |
| 2506517 | 9/1976 | Germany | 264/558 |
| 3241005 | 11/1982 | Germany | |
| 3414029 | 4/1984 | Germany | |
| 3241005 | 8/1984 | Germany | 264/209.4 |
| 52-76691 | 6/1977 | Japan | |
| 583921 | 12/1977 | U.S.S.R. | 264/209.2 |

Primary Examiner—Jeffery R. Thurlow
Attorney, Agent, or Firm—Leydig, Voit & Mayer

[57] ABSTRACT

The invention proposes an improved process and a device for cooling the internal surface of the wall of a pipe made of plastic during its manufacture by extrusion. The cooling agent is dispersed on the internal surface of the pipe by successive atomization at given time intervals. The cooling agent is advantageously dispersed by means of an injection which is displaced axially inside the pipe in a reciprocating movement. The injector may be advantageously equipped with means providing a rotating cone of dispersed droplets.

20 Claims, 1 Drawing Sheet

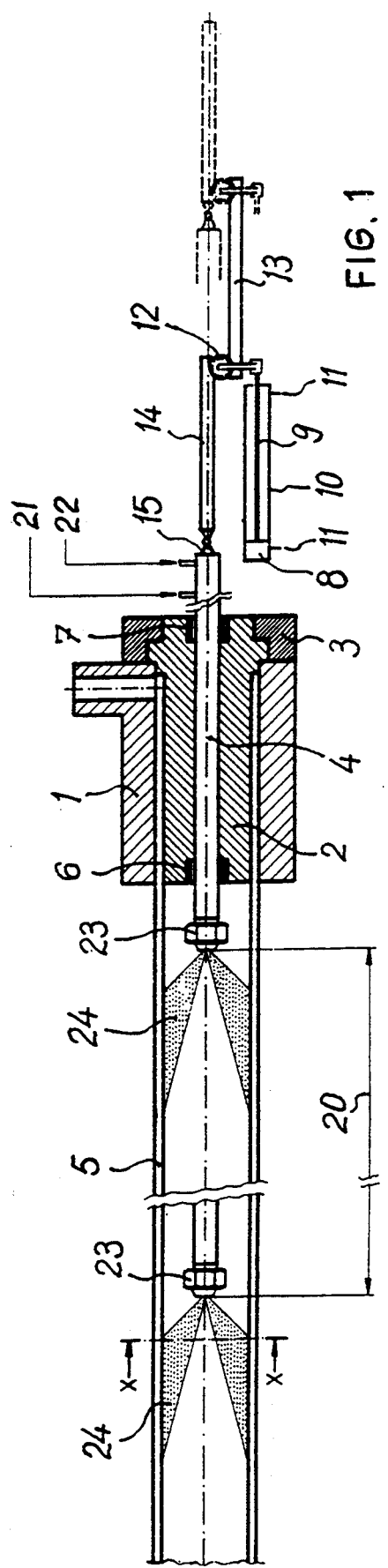
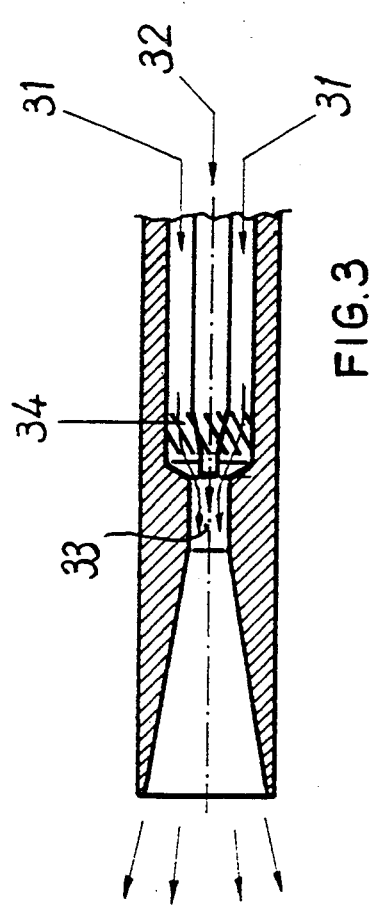
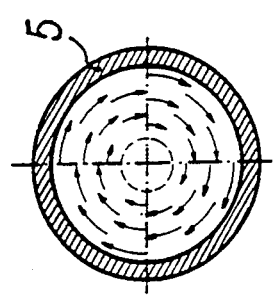

PROCESS AND A DEVICE FOR COOLING A PIPE DURING ITS MANUFACTURE BY EXTRUSION

BACKGROUND OF THE INVENTION

1. Field of the Invention:

The present invention relates to a process and a device for cooling the internal wall of a pipe made of plastics material during its extrusion.

2. Description of the Prior Art:

Modern manufacture of pipes made of plastics material by extrusion demands high-output extruders. Nevertheless, in order to produce large quantities of high quality pipes it is essential that the pipes are cooled during their extrusion in the most intensive and effective manner possible.

Conventional cooling using a water jet on the external surface is no longer suitable, given that the cooling is limited by the length of the cooling distance. The heat to be dissipated also depends on the thickness of the pipe wall and on the extrusion speed.

A solution has therefore been sought based on cooling via the inside of the pipe. Proposals based on the use of counter-current air or water or based on indirect cooling give results which are less than satisfactory.

Internal cooling by the dispersion of water has proved to be more promising. For this purpose small water droplets are sprayed in the form of a mist onto the internal wall of the pipe. From the heat transfer point of view the spraying of droplets represents a good solution, given that the quantity of heat necessary for the evaporation of water (latent heat) and therefore the heat removed from the pipe to be cooled, is about five times the quantity of heat which is removed by the water in a convective process.

Various modifications of this type of cooling are described in German Patent Applications DE-A 2455779, DE-A 3241005 and DE-A 3414029. According to these modifications, the cooling agent is sprayed in the form of droplets via a fixed device comprising a central orifice or a plurality of orifices distributed around the circumference. The device is disposed fixed, and is fixed in relation to the tube which travels axially.

It has been found that this cooling system comprises disadvantages and shortcomings.

In practice an important phenomenon which affects the cooling of pipes stems from the thermal conduction of the constituent material. The coefficient of thermal conduction of plastic materials is low. It follows from this that heat located at the surface or near the surface will be easily removed, but heat located at some depth in the pipes requires a period of time in order to reach the surface. Spraying droplets as proposed in the prior art only enables heat to be removed from the surface of the pipe.

Moreover, if a film of water is atomised onto the hot wall of the extruded pipe, part of the water is evaporated but the major part of the dispersed water runs from the pipe wall towards the bottom and converges in this region. The water then only contributes to the internal cooling of the pipe in this region. The cooling of the pipe is asymmetric. Furthermore, it has been noted that water droplets dispersed on a pipe made of plastic material preserve their form, given that the wetting between the water and the plastic material is poor, particularly when high density polyethylene is used. This phenomenon also impairs the efficacy of cooling with the aid of dispersed droplets.

SUMMARY OF THE INVENTION

The object of the present invention is to remedy these disadvantages and to provide a process and a device which enable improved cooling of the internal wall of an extruded pipe to be effected.

According to the invention a cooling agent is dispersed on the surface of the internal wall of the pipe in a plurality of successive iterations or cycles at given time intervals.

The element of time is thus caused to act in the cooling procedure. The heat inside the pipe wall has time to reach the surface after the heat near the surface has been removed. By spraying the same surface several times in succession, the disadvantages resulting from the prior art are overcome.

According to one advantageous process and device, the cooling agent is dispersed by means of a device placed inside the extruded pipe which is displaced in a reciprocating axial movement, i.e. in an oscillating movement.

According to a preferred embodiment, the cooling agent is dispersed in accordance with a rotating movement.

BRIEF DESCRIPTION OF THE DRAWINGS

The invention will be described in more detail below by way of example only, with the aid of an example of an embodiment and with reference to the accompanying Figures, where:

FIG. 1 is a schematic longitudinal section through an embodiment of the invention;

FIG. 2 is a section along the line X—X of FIG. 1;

FIG. 3 is a schematic section through a rotating dispersion injector.

DESCRIPTION OF THE PREFERRED EMBODIMENT

Referring to FIG. 1, this illustrates a pipe extrusion injection head 1 having a chuck 2 and a support 3. The chuck 2 has a central bore through which a coolant dispersion tube 4 is introduced. This tube, therefore has one end situated inside the extruded plastic pipe 5. The central bore comprises a front sliding bush or bushing 6 and a rear sliding bush or bushing 7 which can guide the dispersion tube 4 with low friction during the oscillating movements of the latter. The sealing of the central bore around the tube 4 does not have to be perfect; it only has to prevent the propellant air used for dispersing the cooling agent from flowing back towards the rear. A labyrinth seal (not shown) installed in the rear sliding bush 7 may, therefore suffice.

The oscillating movement of the dispersion tube 4 may be produced in various ways. According to the example, a pneumatic piston 8 acting in both directions and provided with a rod 9 travels in a cylinder 10 comprising an air inlet 11 at both ends.

The piston rod 9 carries a pinion 12 which rotates between a fixed rack 13 and a displaceable rack 14 driven by the piston 8 and extending axially to the rear end 15 of the tube 4 and integral with the latter. The speed of the piston is preferably adjustable so that the displacement to the left (in the drawing), which causes a displacement of the tube 4 inside the extruded pipe 5 in the direction of cooling of the pipe (active phase), can be adjusted.

The rate of displacement of the tube 4 determines the number of oscillations and, therefore, the efficiency of cooling of the pipe.

The travel of the piston 8 in the opposite direction (to the right in the drawing), which causes a displacement of the tube 4 inside the extruded pipe in the direction of the injection head 1 (inactive phase), can be effected very rapidly. The speed of displacement of the tube 4 can be adjusted by various means; a simple solution is to equip the air inlets 11 with sized constrictions.

The speed of displacement of the tube during the active phase can thus be adjusted in relation to the wall thickness of the extruded pipe, the type of plastic material used and the extrusion output. These are the parameters which broadly define the quantity of heat to be removed. The travel of the tube 4 during the inactive phase is preferably as rapid as possible.

An example may illustrate the considerations on the subject of the speed of displacement of the tube 4.

EXAMPLE 1

Extrusion of high-density polyethylene pipe

For an extrusion output of 200 kg/h and a pipe of outside diameter 160 mm and of wall thickness 9.5 mm, the extrusion speed is 750 mm/min. If it is desired to remove 50% of the heat emitted by the wall above 100° C. by internal cooling, it will be necessary to remove about 6000 kcal/h for a (pipe) discharge temperature from the extruder of 200° C. and a specific heat of high-density polyethylene of 0.6 kcal/kg. With a heat of vaporisation of water (at 15° C.) of 590 kcal/g, the quantity of water which is required to be evaporated will be about 10 kg/h.

Starting from the principle that each part of the surface of the pipe wall must be sprayed ten times (at successive intervals), that the effective oscillating stroke of the tube 4 is 750 mm (reference numeral 20 in FIG. 1) and that the speed of the tube (in the active phase) is set at 7500 mm/min, 10 strokes per minute will be required (provided that the short time of the return stroke—the inactive phase—is neglected).

Returning to FIG. 1, reference numerals 21 and 22 represent the admission of the cooling agent, generally water, and the admission of air used as the propellant gas for the cooling agent, respectively.

The tube 4 comprises a dispersing ejector 23 in the form of an injector, spray nozzle or atomizer at its front end (the opposite end from the rack 14). The Figure shows the two extreme positions of the tube during cooling (the fully advanced position and the withdrawn position). According to an advantageous embodiment of the invention, the injector is constructed so as to produce a rotating cone of dispersed droplets. The advantage of rotating the dispersed droplets results from the fact that the cooling agent forms fine and extremely fine droplets which produce direct and indirect wetting of the wall to be cooled. On account of the centrifugal force the fine droplets flow against the wall, whilst the extremely fine droplets form a mist in the propellant air which flows axially over a long distance (cyclone principle). Dispersion by means of the injector and the rotation of the cone therefore provides a double cooling effect; direct cooling by the droplets and secondary cooling caused by the mist.

FIG. 2 illustrates the circulation of the cooling agent in the atomising cone 24.

With reference to FIG. 3, this shows in detail an example of an injector which produces a rotating cone. It comprises a channel 32 in the centre for the propellant air (primary air) surrounded by a channel 31 for introducing the cooling agent with the secondary air. The two channels terminate in a part in the form of a nozzle 33. In the ends of the channels 31 and 32, just in front of the nozzle 33, the injector comprises vanes 34 which produce a rotating cone of dispersed droplets. The channels 31 and 32 are connected to the inlets 21 and 22 (FIG. 1) and comprise a metering pump (not shown) for the admission of cooling agent, which enables the necessary quantity of cooling agent to be regulated. The injector is designed so that it can be introduced into or withdrawn from the chuck without problems.

It is clear that the invention is not restricted to the example described. Any system of dispersing or atomising a cooling agent inside an extruded pipe which gives rise to successive dispersions in such a way that the cooling agent is dispersed on the wall and that when the cooling agent has evaporated cooling agent is again dispersed on the wall provides the effect sought by the invention.

This may be achieved for example by any system for dispersing a cooling agent inside an extruded pipe which can be displaced in a reciprocating axial movement. All such systems fall within the scope of the invention.

It is advantageous, but not essential, if the injector is equipped with means providing a rotating cone of dispersion.

It is evident that the cooling system described may suitably be combined with conventional cooling of the extruded pipe, i.e. by a cooling agent acting on the external wall surface of the pipe. Other advantageous arrangements will be apparent to the skilled person which do not depart from the spirit of the invention which is defined in the appended claims.

I claim:

1. A process for cooling a plastic pipe during its manufacture by extrusion, comprising dispersing a cooling agent in a plurality of successive cycles at predetermined time intervals, to act at least partially on the internal surface of the pipe.

2. A process according to claim 1, wherein the successive cycles are such that each length portion of the extruded pipe is cooled repeatedly.

3. A process according to claim 1, wherein the cooling agent is water.

4. A process according to claim 1, wherein the cooling agent is dispersed by means of a nozzle or injector.

5. A process according to claim 1, wherein the cooling agent is repeatedly sprayed on the internal surface of the pipe, further cooling agent being sprayed on the internal surface when the cooling agent previously sprayed is at least partially evaporated.

6. A process for cooling a plastic pipe during its manufacture by extrusion, comprising dispersing a cooling agent inside the pipe in a reciprocating axial movement in a plurality of successive cycles at predetermined and adjustable time intervals, to act at least partially on the internal surface of the pipe.

7. A process according to claim 6, wherein dispersion of a cooling agent takes place substantially during a forward travel phase of the disperser moving within in the pipe and a reverse travel phase of the disperser is effected rapidly.

8. A process according to claim 1, wherein the cooling agent is dispersed as a rotating cone of dispersed droplets.

9. A process according to claim 1, further comprising simultaneous cooling with the aid of a cooling agent which acts on the external wall surface of the pipe.

10. A device for cooling a plastic pipe during its manufacture by extrusion comprising a tube mounted to be within the pipe in use, an injector for dispersing cooling agent mounted upon the tube, and means for reciprocatingly displacing the injector in the pipe being extruded, the tube having a bore for the passage of a cooling agent to the injector for projection of cooling agent into the pipe onto the wall of the pipe.

11. A device according to claim 10, wherein the injector provides a rotating cone of droplets of the cooling agent.

12. A device according to claim 10, further comprising a piston reciprocable within a cylinder and a pinion situated between a fixed rack and a moveable rack, said piston being connected to the pinion to drive its rotation between the fixed rack and the moveable rack, causing axial movement of the moveable rack, said moveable rack being connected to the tube bearing the injector, to move the tube reciprocatingly.

13. A device according to claim 10, wherein the speed of reciprocating travel of the injector is adjustable.

14. A device according to claim 10, wherein the injector includes vanes to provide a rotating cone of droplets of the cooling agent.

15. A process according to claim 6 wherein the cooling agent is repeatedly sprayed onto the internal surface of the pipe, further cooling agent being sprayed on the internal surface when the cooling agent previously sprayed is at least partially evaporated.

16. A process according to claim 6 wherein the cooling agent is dispersed as a rotating cone of dispersed droplets.

17. A process according to claim 6 wherein the successive cycles are such that each length portion of the extruded pipe is cooled repeatedly.

18. A process according to claim 6 further comprising simultaneous cooling with the aid of a cooling agent which acts on the external wall surface of the pipe.

19. A process according to claim 6 wherein the reciprocating axial movement of the cooling agent has an adjustable stroke velocity.

20. A process according to claim 6 wherein the reciprocating axial movement of the cooling agent has an adjustable stroke length.

* * * * *

UNITED STATES PATENT AND TRADEMARK OFFICE
CERTIFICATE OF CORRECTION

PATENT NO. : 5,422,063
DATED : June 6, 1995
INVENTOR(S) : Pelzer

It is certified that error appears in the above-indentified patent and that said Letters Patent is hereby corrected as shown below:

In the Abstract [57], Line 7, change "injection" to

--injector--;

Column 4, Line 66, change "the" to --a--;

Column 4, Line 66, delete "in".

Signed and Sealed this

Twenty-first Day of November, 1995

Attest:

BRUCE LEHMAN

Attesting Officer

Commissioner of Patents and Trademarks